United States Patent [19]

Burr

[11] Patent Number: 4,927,252

[45] Date of Patent: May 22, 1990

[54] NEWTONIAN TELESCOPE ASSEMBLY WITH ROTARY FLAT MIRROR

[76] Inventor: James D. Burr, 1960 Jefferson Rd., No. 23, Evergreen, Colo. 80439

[21] Appl. No.: 336,870

[22] Filed: Apr. 12, 1989

[51] Int. Cl.[5] .................. G02B 23/06; G02B 23/16; G02B 7/18; G02B 17/06
[52] U.S. Cl. .................................. 350/503; 350/568; 350/563
[58] Field of Search ................ 350/568, 567, 503–505, 350/563

[56] References Cited

U.S. PATENT DOCUMENTS

| | | | |
|---|---|---|---|
| 575,215 | 1/1897 | Davis | 350/568 |
| 1,468,973 | 9/1923 | Porter | 350/503 |

FOREIGN PATENT DOCUMENTS 2045453 10/1980 United Kingdom ................ 350/503

*Primary Examiner*—Jon W. Henry
*Attorney, Agent, or Firm*—Kolisch, Hartwell & Dickinson

[57] ABSTRACT

A telescope assembly which includes a telescope supported for movement on an equatorial drive ring about a horizontal declination axis. The drive ring is rotatably supported on a stand for movement of the telescope about a polar axis extending through the declination axis and perpendicular to the declination axis. A telescope in the assembly includes a nose adjustably supported on an annular mounting frame, whereby the nose is rotatable to swing in an arc the position of a viewing assembly. The annular mounting frame is connected through easily disconnected truss rods to the base of the telescope which mounts the primary mirror in the telescope.

5 Claims, 2 Drawing Sheets

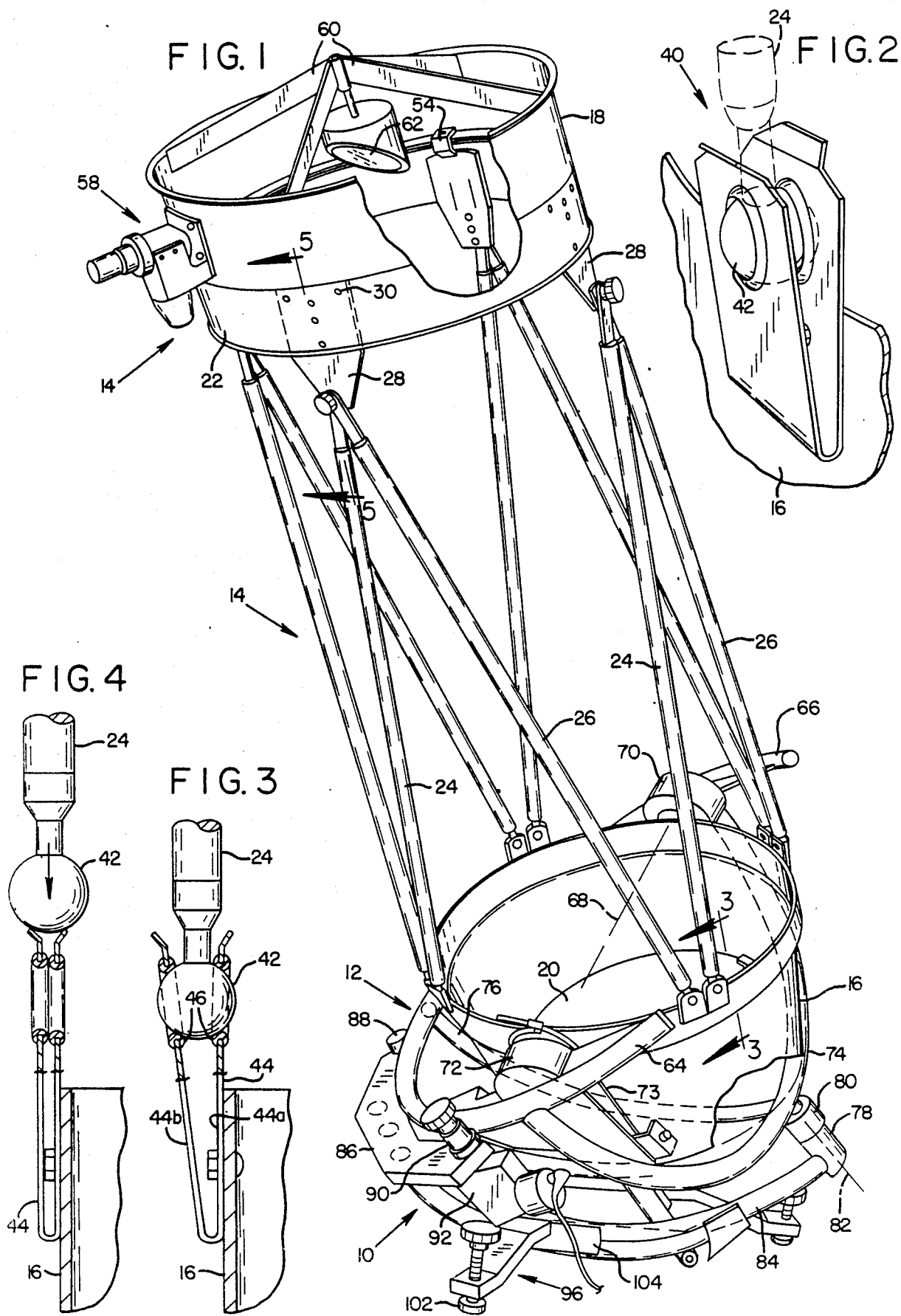

FIG. 5
FIG. 6
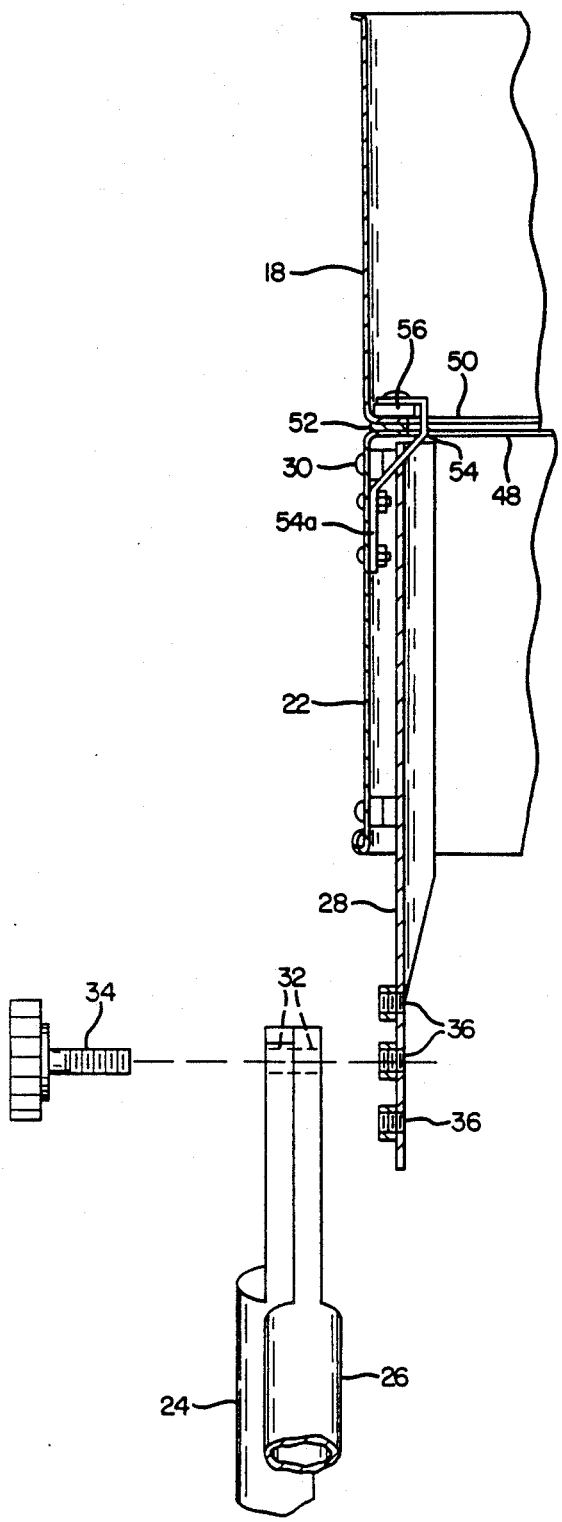
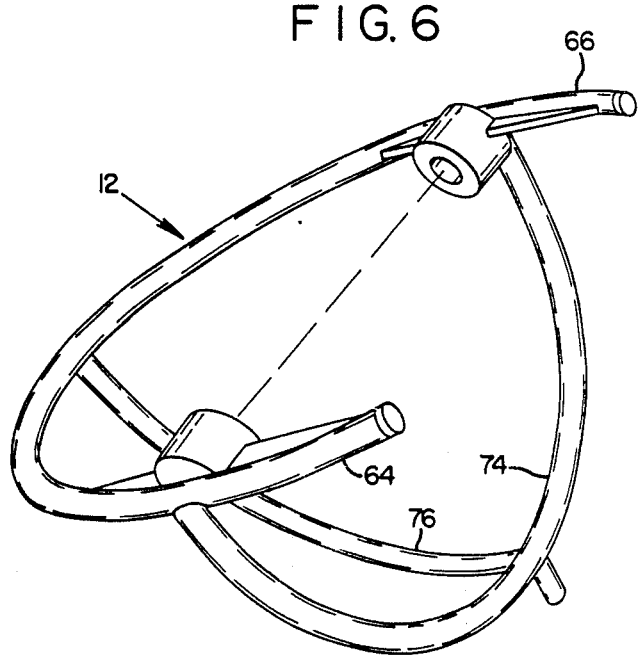

NEWTONIAN TELESCOPE ASSEMBLY WITH ROTARY FLAT MIRROR

BACKGROUND AND SUMMARY OF THE INVENTION

This invention relates to telescopes, and more particularly to a telescope assembly which includes a telescope and a stand supporting the telescope on the ground incorporating a number of novel features rendering the assembly easy to use, precise in the manner in which adjustments are made in the telescope assembly, and flexible in operation, in the sense of providing a number of adjustments not present in comparable telescope assembles known to date. The telescope assembly is a precision instrument, with excellent drive accuracy and stability, but nevertheless is relatively easily broken down with a minimum number of tools to compact the assembly and ready it for transport from one location to another.

An object of the invention is to provide, therefore, an improved telescope assembly including a telescope and a stand for supporting the telescope on the ground, incorporating features rendering the assembly easy to use and versatile in operation.

Another object is to provide, in an Newtonian-type telescope, what is referred to as a nose which mounts the viewing assembly through which an object is viewed, as well as the usual flat mirror providing a viewing path extending between the viewing assembly and the primary mirror at the base of the telescope, and a rotatable mounting for the nose which enables the viewing assembly to be repositioned for ease of use with rotation of the primary mirror at the base of the telescope about the polar axis of the telescope.

Anther feature and object is the incorporation in a telescope including a rotatable nose, an annular mounting frame providing the rotatable mounting for the nose, and truss rods supporting the mounting frame on the base of the telescope, this base mounting the primary mirror of the telescope. The connection of one set of ends of these truss rods with the annular mounting frame which mounts the nose is an adjustable one, which accommodates change of the focal length in the telescope. The mounting of the opposite ends of these rods with the base of the telescope preferably includes snap-fitting indent-detent means promoting ease of disassembly of the telescope.

A further feature of the telescope assembly of the invention is the provision of a ring as part of the support for the telescope which is rotatable about a polar axis. Thus, the ring is rotatably mounted on a stand in the assembly, with a motor-driven drive roller mounted on the stand co-actible with the ring to produce movement of the ring and movement of the telescope about the polar axis. Movement of the telescope about a declination axis is provided by rotatably supporting the telescope on the ring through means provided at diametrically opposite portions of the ring which rotatably support the base of the telescope.

The telescope assembly of the invention further includes a stand which includes two frames, namely a ground-supported frame which may include legs and which actually rests on the ground. Adjustably mounted on this ground-supported frame is what is referred to herein as a subframe, which provides support for the ring described, and through the ring the telescope which is supported on the ring.

These and various other objects and advantages are attained by the invention, which is described herein below in connection with the accompanying drawings, wherein:

FIG. 1 is a perspective view illustrating a telescope assembly as contemplated herein;

FIG. 2 is a perspective view, somewhat enlarged, illustrating a snap-fitting means employed in connecting the base of a truss rod to the base of the telescope;

FIG. 3 is a view taken generally along the line 3—3 in FIG. 1 further illustrating the snap-fitting means;

FIG. 4 is similar to FIG. 3 but illustrates the operation of the snap-fitting means;

FIG. 5 is a cross sectional view, on a somewhat enlarged scale, taken generally along the line 5—5 in FIG. 1.; and FIG. 6 is a perspective view illustrating an equatorially drive ring in the telescope assembly and yoke structure which is connected to the ring for the purpose of adding rigidity and to accommodate mounting of the ring.

Referring now to the drawings, and more particularly FIG. 1, the telescope assembly illustrated includes a stand or stand assembly 10 which rests on the ground or other support surface. This stand assembly rotatably supports, for rotation about a polar axis, what is referred to herein as an equatorial drive ring and associated rigidizing yoke structure generally shown at 12. A telescope, generally designated at 14, includes a base 16. This base is adjustably rotatably mounted at opposite sides on equatorial drive ring 12 for movement of the telescope about what is referred to as a declination axis. The forward end of the telescope 14, which in FIG. 1 is illustrated as directed into the air, includes an adjustably rotatably mounted nose, designated at 18, which is rotatable about the axis of the telescope.

The base of the telescope has mounted within it the usual parabolic or primary mirror shown, partially at 20, which is directed toward the object being viewed with suitable adjustments made in the position of the telescope.

Positioned forwardly of this base, adjacent nose 18, is what is referred to herein as an annular mounting frame 22. This annular mounting frame is supported on the base through Serrurier truss rods, exemplify by the rods shown at 24, 26.

The rods are mounted in such a manner as to permit ready detachment when collapsing the telescope for transport. Furthermore, they are mounted in such a manner as to permit adjustments to be made in the position of frame 22 with respect to the base along the axis of the telescope thus to change the focal length of the telescope.

More specifically, and referring to FIGS. 1 and 5, secured as by fasteners 30 to the inner side of annular mounting frame 22, at locations distributed about the frame, are a plurality of mounting brackets 28. Rods 24, 26 have flattened upper ends, and bores, such as bores 32, extend through these flattened upper ends accommodating the insertion therethrough of the threaded shanks of bolts 34. The projecting lower end of each mounting bracket contains a series of internally threaded bores 36, spaced from each other in a direction extending axially of the telescope. The flattened upper ends of a pair of rods are secured to a bracket with bolt 34 passed through bores 32 and screwed into a selected one of the bores 36. The ends of the truss rods in FIG. 5 are shown secured to the intermediate bore in the series of bores 36. A decreased focal length is obtained by using the upper most bore in this series in the attachment, and an increase in focal length is obtained by using the lower most bore in this series.

Providing a secure but quickly detachable mounting of the bottom ends of these truss rods with base 16 is a snap-fitting indent-detent means, designated generally at 40. Describing specifically this means, each rod terminates in a ball 42. A U-shaped spring member 44, with one leg 44a secured to the telescope base and an opposite leg 44b yieldably and resiliently disposed opposite the secured leg, is provided for the bottom end of each truss rod. The legs have aligned circular apertures 46 therein. To mount the bottom end of a truss rod, the ball end of the rod is forced between the opposed legs of a spring member, the legs then yieldably moving away from each other to accommodate travel of the ball between the spring member legs until such becomes seated in circular apertures 46.

Nose 18 is an annular member adjustably rotatably supported on annular mounting frame 22 with its center, as well as the center of frame 22, aligned with the axis of the telescope.

As seen in FIG. 5, the upper margin of frame 22 is formed with an in-turned annular flange or rim 48, and the lower margin of nose 18 has a similar in-turned rim or flange 50. Distributed circumferentially about rim 48 are a series of pads, as exemplified by nylon pad 52 shown in FIG. 5, and these may be secured in an appropriate manner to rim 48. These pads collectively provide a guide surface guiding nose 18 for adjustable rotary movement about the axis of the telescope. Also distributed circumferentially about mounting frame 22 are a series of roller mounting brackets 54. Each has a lower leg portion 54a suitably secured to the annular mounting frame, and each rotatably supports adjacent its upper end a roller, such a nylon roller 56 riding on the inner surface of the nose. Collectively the rollers serve to maintain the nose in its position centered on the axis of the telescope.

Referring to FIG. 1, the telescope nose further mounts a viewing assembly, generally shown at 58, normally having an adjustable focusing means and used in observing the object viewed by the telescope. Mounted centrally of the nose, on strut bars 60, is an optical flat mirror 62. In the telescope, a viewing path is established extending from the viewing assembly to the optical flat mirror and then to the primary mirror at the base of the telescope which is directed through telescope adjustment toward the object in the sky being observed.

Equatorial drive ring 12 does not extend continuously but is broken away so as, in effect, to present a pair of arms, as illustrated in FIGS. 1 and 6, shown at 64 and 66, which straddle the telescope base. The telescope is adjustably mounted on the equatorial guide ring for movement about a horizontal declination axis 68. Specifically, at diametrically opposite portions of the equatorial drive ring is a bearing-and-shaft structure relatively rotatably mounting the base of the telescope on the equatorial drive ring. Such a bearing-and-shaft structure 70 is shown interconnecting arm 66 of the ring and the upper side of the base as illustrated in FIG. 1. A bearing-and-shaft structure 72 interconnects arm 64 and the opposite side of the telescope base. A tangent arm 73 joining with the shaft in structure 72 is swung with operation of a motor (not shown) to shift the telescope about the declination axis.

Equatorial drive ring 12 has, as an integral part thereof, and providing rigidity and as a means for mounting the ring, a pair of what are referred to herein as yokes 74, 76 (see FIGS. 1 and 6). These depend from the ring as shown in the drawings. Stand assembly 10 includes a post 78 adjacent the base of the telescope, and yoke 74 of the ring is journaled at 80 in this post. The journal mounting described provides for movement of the ring about a polar axis, which is indicated at 82. In an equatorially mounted telescope, the telescope assembly is set up so that this polar axis parallels that of the axis of the earth.

Post 78, a curved bar 84, and a mounting plate 86, are integrally joined together and form what is known as a subframe in stand assembly 10. A journal 80 has been described which pivotally mounts, through yoke 74 the equatorial ring for rotary movement about a polar axis. Providing additional support for the equatorial drive ring, and mounted on mounting plate 86, are an idler roller 88 and a drive roller 90. These rollers engage the equatorial drive ring and support it during operation of the telescope.

Drive roller 90 is powered by a selectively controlled motor drive 92. Through controlled movement of the drive ring produced through operation of this motor drive, proper positioning of the telescope about the polar axis is produced.

A ground-supported frame 96 supports the subframe described with the subframe adjustably mounted thereon to permit latitude adjustments in the subframe depending upon the particular latitude where the telescope is set up for viewing. Specifically, such ground-supported frame includes legs 98, each having adjustable ground pads 102 provided thereon which engage the ground. Guide structure, partially shown at 104 in FIG. 1, receives and guidably supports the subframe. The subframe is movable in this guide structure to produce adjustments in the subframe relative to the ground-supported frame about an axis which extends generally horizontally. Suitable securing means is provided for securing the subframe with respect to the ground-supported frame in any given adjusted position.

In the telescope assembly described, sturdy but adjustable support is provided the telescope through stand assembly 10 and the equatorial drive ring. The drive ring is rotatable about an established polar axis through selective control of motor unit 92. Movement of the telescope with respect to the equatorial drive ring is produced by adjusting the telescope about the declination axis described.

With the telescope moved into position to track a star or other object, the equatorial drive ring will have different positions which will effect the position of annular mounting frame 22. Because nose 18 is rotatably mounted on mounting frame 22, such can be shifted relative to the mounting frame to provide for comfortable viewing of any particular part of the sky which is being viewed by the telescope.

The telescope assembly described conveniently provides for gross adjustments in the focal length through changing the position of the annular mounting frame with respect to the telescope base when setting up the telescope. The position of the annular mounting frame is determined by the bore selected in the series of bores 36 utilized to support the upper ends of truss rods 24, 26.

The telescope assembly is readily broken down to accommodate transport through disconnecting of the truss rods from the mounting frame and the telescope base, respectively. Upper ends of the truss rods are removed through unfastening screws 34. Lower ends of the truss rods are disconnected from the base through dislodging them from the snap-fitting means 40 described. This enables the annular mounting frame, and the nose which it supports, to be separated from the base of the telescope and for transport purposes rested on this base.

It should be obvious that a highly versatile yet precise instrument has been disclosed. While a particular embodiment of the invention has been described herein, obviously changes and variations are possible without departing from the invention.

His claimed and desired to secure as Letters Patent:

1. In a Newtonian telescope that includes a base and a primary mirror for the telescope mounted on said base, a nose spaced along the axis of the telescope and forwardly of said primary mirror, a viewing assembly mounted on said nose disposed laterally of the viewing path extending between the primary mirror and the object viewed, and a flat mirror mounted on said nose providing a viewing path extending between the viewing assembly and said primary mirror, nose mounting means rotatably mounting said nose for rotation about the axis of the telescope thus to swing the viewing assembly in an arc extending about said axis, said nose mounting means including an annular mounting frame, and truss rods extending from and interconnecting the annular mounting frame and said base, said annular mounting frame having a guide surface and the guide surface guidably supporting said nose for rotatory movement, and means rotatably mounting the telescope for rotation about a polar axis.

2. The telescope of claim 1, wherein said truss rods are adjustably connected to said annular mounting frame to permit change in the distance of said mounting frame from said base.

3. The telescope of claim 2, wherein said truss rods have a set of ends connected to said base of said telescope through snap-fitting indent-detent means.

4. In a telescope assembly, an elongate telescope including a base and a primary mirror for the telescope mounted on said base, a nose spaced along the axis of the telescope and forwardly of said primary mirror, a viewing assembly mounted on said nose disposed laterally of the viewing path extending from the primary mirror to the object viewed, and a flat mirror mounted on said nose provided a viewing path extending between the viewing assembly and primary mirror, a stand assembly for supporting the telescope on the ground, said stand assembly including a ground-supported frame and an adjustable frame adjustably mounted on said ground-supported frame accommodating latitude adjustment in the telescope, a ring rotatably mounted on the stand assembly for rotation about a polar axis for the telescope assembly which axis extends through the center of the ring normal to the plane of the ring, means on diametrically opposite portions of said ring rotatably supporting said base of the telescope for swinging movement of the telescope about a declination axis, a nose mounting means rotatably mounting said nose in the telescope for rotary movement relative to said base about the axis of the telescope thus to swing the viewing assembly in an arc which extends about said axis of the telescope, said nose mounting means including an annular mounting frame truss rods extending from and interconnecting the mounting frame and said base, said mounting frame having a guide surface and said guide surface guidably supporting the nose for rotatory movement.

5. The telescope assembly of claim 4, wherein said truss rods are adjustably connected to said annular mounting frame to permit change in the distance of said mounting frame from said base.

* * * * *